UNITED STATES PATENT OFFICE 2,041,858

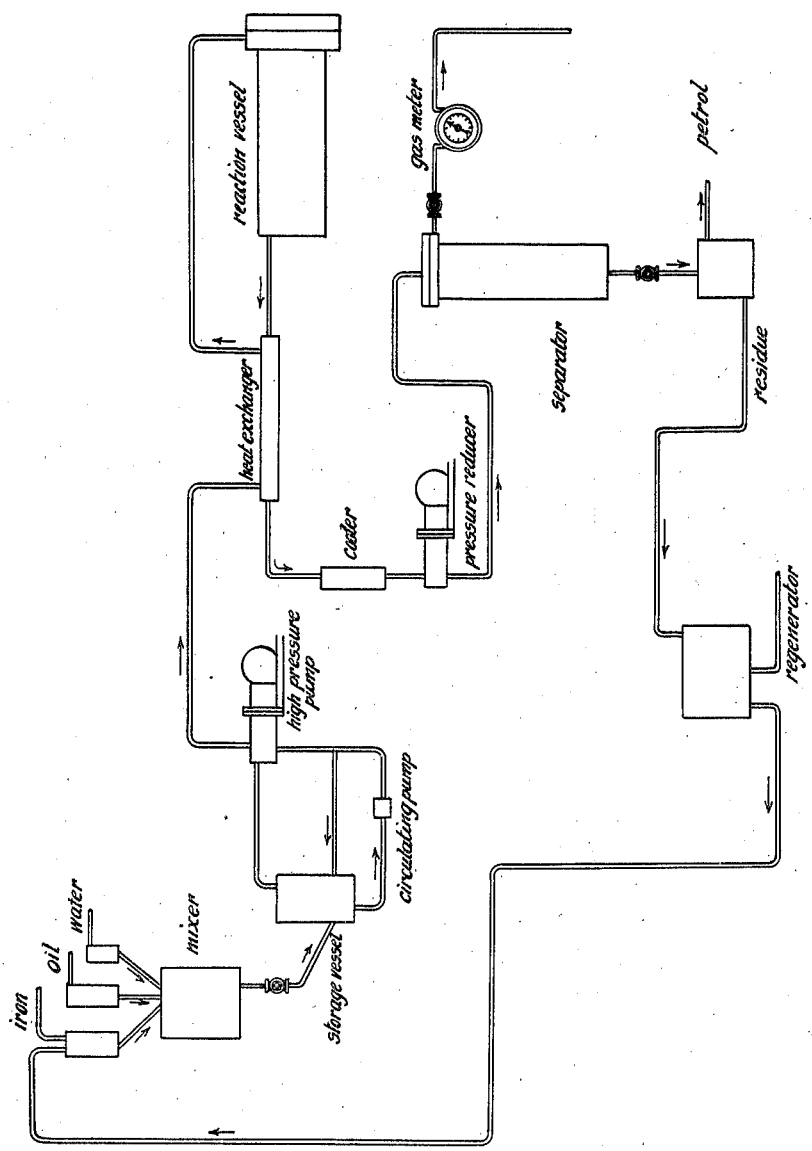

HYDROGENATION OF CARBONACEOUS MATERIALS

Theodor Wilhelm Pfirrmann, Castrop-Rauxel, Germany

Application August 31, 1932, Serial No. 631,124
In Germany September 8, 1931

5 Claims. (Cl. 196—53)

My invention refers to a method of hydrogenating carbonaceous materials. It is an improvement on the method described in the copending application for patent of the United States filed by Richard Bayer on September 21, 1929, Serial No. 394,393, according to which carbonaceous materials are heated in a closed vessel to the temperature where decomposition begins in the presence of a mixture of finely distributed, preferably spongy iron and water.

In this process the hydrogenation proceeds sufficiently far only if the formation of hydrogen by the interaction of the iron and the water proceeds at least as quickly as the decomposition of the carbonaceous material. Since the reaction between iron and water, being a heterogeneous reaction, proceeds very slowly, it has been suggested to add substances capable of accelerating the reaction, such as copper or zinc, or oxides, such as zinc oxide.

I have now found that salts having an acid reaction or splitting off acid are capable of influencing this reaction in a particularly efficient manner; thus the reaction is greatly accelerated by magnesium chloride, ammonium chloride, or by alkali borates. While the presence of the metals or oxides previously suggested already brought about a considerable acceleration of the formation of hydrogen, still the conversion of the iron could not be carried to an end in accordance with the equation $$Fe + H_2O = FeO + H_2$$

for the reaction came to a standstill after about one half of the iron had been reacted. If, as is mostly the case, the carbonaceous material contains a greater percentage of sulfur, even less than one half of the iron will react. For during the formation of hydrogen the surface of the single particles of iron is first converted into oxide and, if sulfur is present, partly also into ferric sulfide, which prevents the water from reacting further with the iron.

Obviously this deficient reaction of the iron is a great disadvantage, since the two- to threefold of the calculated quantity of iron must be added. Further difficulties are experienced when regenerating the partly converted iron, since the layer of ferric sulfide covering the iron particles forms a hindrance to the reduction, so that the iron as a whole must first be roasted or calcined, in which operation also the metallic iron present is converted into oxide.

The present invention, by employing as catalysts salts having an acid reaction or splitting off acid, avoids all these drawbacks. While at first the use of such salts appeared inadmissible in view of the probable corrosion of the autoclave vessel, I have found that no such corrosion will take place under the conditions of this reaction. On the contrary, these salts have been found to enormously accelerate the reaction of the iron and in consequence also the effect of the hydrogenation as such. I have found magnesium chloride and ammonium chloride and in some cases also the alkali borates to be particularly efficient. Good results have further been obtained with ferro-chloride, chromo-chloride, nickel chloride and mangano-chloride. Preferably combinations of two or more of these salts can be used, such as a mixture of 1 part magnesium chloride and 3 parts nickel chloride per 100 parts iron.

Contrary to what could be expected, the reaction $$Fe + H_2O = FeO + H_2$$

if one of these salts is present, will not only proceed to the end, but also the ferrous oxide formed in the reaction will be consumed under formation of hydrogen according to the equation $$2FeO + H_2O = Fe_2O_3 + H_2$$

Thus, if MgCl₂ is present, almost the threefold quantity of hydrogen is produced from a given quantity of iron, as compared with the accelerators hitherto suggested, although much less MgCl₂ need be used. While at least 10–15% (calculated on the weight of the iron) of the accelerators previously suggested, such as copper, zinc or zinc oxide, must be present in order to obtain a sufficient acceleration, 0.5–5% MgCl₂ will suffice.

It is important to note that the salts added need not be pure, salt solutions containing a salt of acid reaction being equally efficient. I have found the residual liquors (foots) resulting in the treatment of potassium minerals, which contain MgCl₂, to be well fit for use as accelerators of the reaction.

In practicing my invention, I may for instance proceed as follows:—

Example 1

10 parts by weight of a residue, boiling above 350° C., from the distillation of crude oil (petroleum) are mixed with 3.5 parts finely subdivided (spongy) iron and 2 parts of a 3% MgCl₂ solution, and the mixture is forced by pumping under pressure into a pressure resistive reaction vessel (autoclave) heated to about 450° C. The product of the reaction which occurs by the interaction of the iron and the water, furthered by the presence of MgCl₂, and hydrogenation of the carbonaceous material by the nascent hydrogen, is an oil, 40 parts of which boil at 180° C., while further 35 parts pass over in the interval ending at 300° C. The distillate boiling above 300° C. may be treated further for the production of lubricating oil or may be once more subjected to hydrogenation. In this reaction not less than 95% of the iron are converted into a ferric compound.

*Example 2*

10 parts crude benzene, such as recovered for instance when distilling the wash oil resulting in the purification of crude benzene, are continuously forced by pumping into the autoclave together with 3 parts spongy iron and 2 parts of a 3% MgCl₂ solution, the reaction mixture being heated in the autoclave to 450° C. The resulting product contains 25% more of the benzene fraction boiling below 150° C., than described with reference to Example 1. By simple distillation this fraction can be converted into liquid fuel for engines.

*Example 3*

10 parts of a brown coal tar boiling above 200° C. and rich in phenol are treated in the autoclave at about 460° C. with 6 parts spongy iron and 3 parts of a 6% sodium borate solution containing about 1% ammonium chloride. 22% of the hydrogenation product boil up to 150° C., about 35% between 150° and 220° C. The percentage of acid oils has dropped from 30% to 8%.

*Example 4*

100 parts wood meal are hydrogenated at about 440° C. in the autoclave with 80 parts iron and 40 parts of a diluted residual liquor from the treatment of potash minerals, this liquor being obtained by diluting a solution containing 14 grams KCl, 50 grams MgSO₄, 350 grams MgCl₂ and 12 grams NaCl per litre, so that its contents of MgCl₂ is reduced to 2%. From 100 parts wood meal (calculated on the dry product) about 50 parts oil are recovered.

*Example 5*

10 parts of a bituminous coal are mixed with 10 parts iron and finely ground. To this mixture are added 5 parts of a 3% solution of MgCl₂ and 5 parts of a heavy benzene such as is recovered as a byproduct in the distillation of coal in coke ovens. The mixture is forced into the hydrogenation vessel heated to 440° C. on one side and withdrawn on the other side. 60% of the coal as such, after abducting ashes and water, are converted into an oil which starts boiling at 70° C. and 75% of which pass over within the range of temperature ending at 360° C.

It will be understood that the process is always a continuous one, the mixture of reagents being forced into the heated reaction vessel on one side and withdrawn on the other side after having undergone reaction at the high temperature and very high pressure (ranging probably between 100 and 500 atmospheres), which arises in the autoclave.

The examples show that the presence of salts having an acid action or splitting off acids brings about a considerable increase of the hydrogenating effect as compared with the results hitherto obtained.

As solvents from the coals or other carbonaceous materials I have found lower boiling oils, such as heavy benzene, light oil and the like to be particularly suited. I may, however, also replace these solvents with advantage by a salt solution, for instance by suspending the finely ground mixture of the carbon and iron in such a quantity of a calcium chloride solution containing some MgCl₂, that the pasty mixture thus formed can still be forced into the autoclave by pumping. In proceeding in this manner, the hydrogenation effect is still further increased, since no hydrogen is consumed by the solvent. However in this case the operating pressure will be higher.

The use of a calcium chloride solution containing MgCl₂ as a carrier for the coal is of particular advantage in those cases, where a coal shall be subjected to hydrogenation, which has been prepared with a solution of calcium chloride and deprived of ashes, for in such a case there is no need for completely separating the calcium chloride solution from the coal.

The acceleration of the reaction between the water and the iron by adding acid salts offers the further advantage that the hydrogenation vessel can be utilized in a far more economical manner since the presence of these accelerators allows obtaining much higher yields per volume. As the reaction between the iron and the water is an exothermic one, with magnesium chloride as an accelerator a considerably greater quantity of heat is liberated than with other salts, so that if the reaction mixture has been preheated sufficiently, the supply of heat to the reaction vessel from without may be dispensed with altogether.

Since according to the mode of operation previously adopted only about one half of the iron was converted into FeO, only about 85 heat units were liberated per kilogram iron. If operating in accordance with the present invention, the reaction may for instance result in an iron oxide having the following constitution:

| | Per cent |
|---|---|
| Metallic Fe | 0.5 |
| FeO | 37.7 |
| Fe₂O₃ | 57.9 |
| Other constituents | 3.9 |

This corresponds to a reaction which partly leads beyond Fe₃O₄ and furnishes about 250 heat units per kilogram iron.

The drawing is a flow sheet illustrating the process.

Various changes may be made in the details disclosed in the foregoing specification without departing from the invention or sacrificing the advantages thereof.

I claim:—

1. The method of hydrogenating carbonaceous materials comprising acting on these materials capable of being hydrogenated at a temperature ranging between 400 and 500° C. and under a pressure exceeding 100 atmospheres with nascent hydrogen developed in the reaction mixture by the interaction of spongy iron and water in the presence of a salt of the group constituted by magnesium chloride, ammonium chloride, ferro-chloride, chromo-chloride, nickel chloride, and mangano-chloride.

2. The method of hydrogenating carbonaceous materials comprising acting on these materials capable of being hydrogenated at a temperature ranging between 400 and 500° C. and under a pressure exceeding 100 atmospheres with nascent hydrogen developed in the reaction mixture by the interaction of spongy iron and water in the presence of two salts of the group constituted by magnesium chloride, ammonium chloride, ferro-chloride, chromo-chloride, nickel chloride, and mangano-chloride.

3. The method of hydrogenating carbonaceous materials comprising acting on these materials capable of being hydrogenated at a temperature ranging between 400 and 500° C. and under a pressure exceeding 100 atmospheres with nascent hydrogen developed in the reaction mixture by the interaction of spongy iron and water in the presence of a residual liquor from the treatment of potash minerals which contains magnesium chloride.

4. The method of hydrogenating carbonaceous materials comprising acting on these materials capable of being hydrogenated at a temperature ranging between 400 and 500° C. and under a pressure exceeding 100 atmospheres with nascent hydrogen developed in the reaction mixture by the interaction of spongy iron and water in the presence of a dilute watery solution containing magnesium chloride and a metal chloride.

5. The method of hydrogenating carbonaceous materials comprising acting on these materials capable of being hydrogenated at a temperature ranging between 400 and 500° C. and under a pressure exceeding 100 atmospheres with nascent hydrogen developed in the reaction mixture by the interaction of spongy iron and water in the presence of a dilute watery solution containing magnesium chloride and nickel chloride.

THEODOR WILHELM PFIRRMANN.